United States Patent
Nimura et al.

(10) Patent No.: US 8,495,370 B2
(45) Date of Patent: Jul. 23, 2013

(54) INFORMATION PROCESSING APPARATUS AND AUTHENTICATION BYPASSING METHOD

(75) Inventors: Kazuaki Nimura, Kawasaki (JP);
Zhaogong Guo, Kawasaki (JP);
Yousuke Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 25 days.

(21) Appl. No.: 13/346,983

(22) Filed: Jan. 10, 2012

(65) Prior Publication Data
US 2012/0254613 A1   Oct. 4, 2012

(30) Foreign Application Priority Data

Mar. 30, 2011   (JP) .................................. 2011-076800

(51) Int. Cl.
*H04L 9/32* (2006.01)
*G06F 1/26* (2006.01)

(52) U.S. Cl.
USPC ......................................... 713/168; 713/310

(58) Field of Classification Search
USPC .................................. 713/168, 310
See application file for complete search history.

(56) References Cited

U.S. PATENT DOCUMENTS

| | | | | |
|---|---|---|---|---|
| 5,844,986 | A | * | 12/1998 | Davis ............................ 713/187 |
| 2003/0084337 | A1 | * | 5/2003 | Simionescu et al. .......... 713/200 |
| 2006/0242438 | A1 | * | 10/2006 | Baba et al. .................... 713/300 |
| 2010/0106810 | A1 | * | 4/2010 | Grohman ...................... 709/220 |
| 2010/0120406 | A1 | * | 5/2010 | Banga et al. .................. 455/418 |
| 2011/0154484 | A1 | * | 6/2011 | Shimabe ........................ 726/19 |

FOREIGN PATENT DOCUMENTS

| | | |
|---|---|---|
| JP | 2000-029962 | 1/2000 |
| JP | 2004-356861 | 12/2004 |

OTHER PUBLICATIONS

Fujitsu Limited, "FMV-W630", http://www.fmworld.net/biz/fmv/support/fmvmanual/0410-0503/3951w6/h_bios10.html, Nov 1, 2004 (partial English Translation).
Kazuteru, Kasahara, "Ubiquitous Intelligence Agency", http://pc.watch.impress.co.jp/docs/2008/1204/ubiq233.htm, Dec. 4, 2008 (partical English Translation).

* cited by examiner

*Primary Examiner* — Kambiz Zand
*Assistant Examiner* — Aubrey Wyszynski
(74) *Attorney, Agent, or Firm* — Fujitsu Patent Center

(57) ABSTRACT

In an information processing apparatus, when a command does not include information relating to whether to perform or not to perform authentication of firmware or a first control unit, authentication or authentication bypassing is performed based on a power state and an operation table, and when the command does include the information, the authentication or the authentication bypassing is performed based on the command.

12 Claims, 11 Drawing Sheets

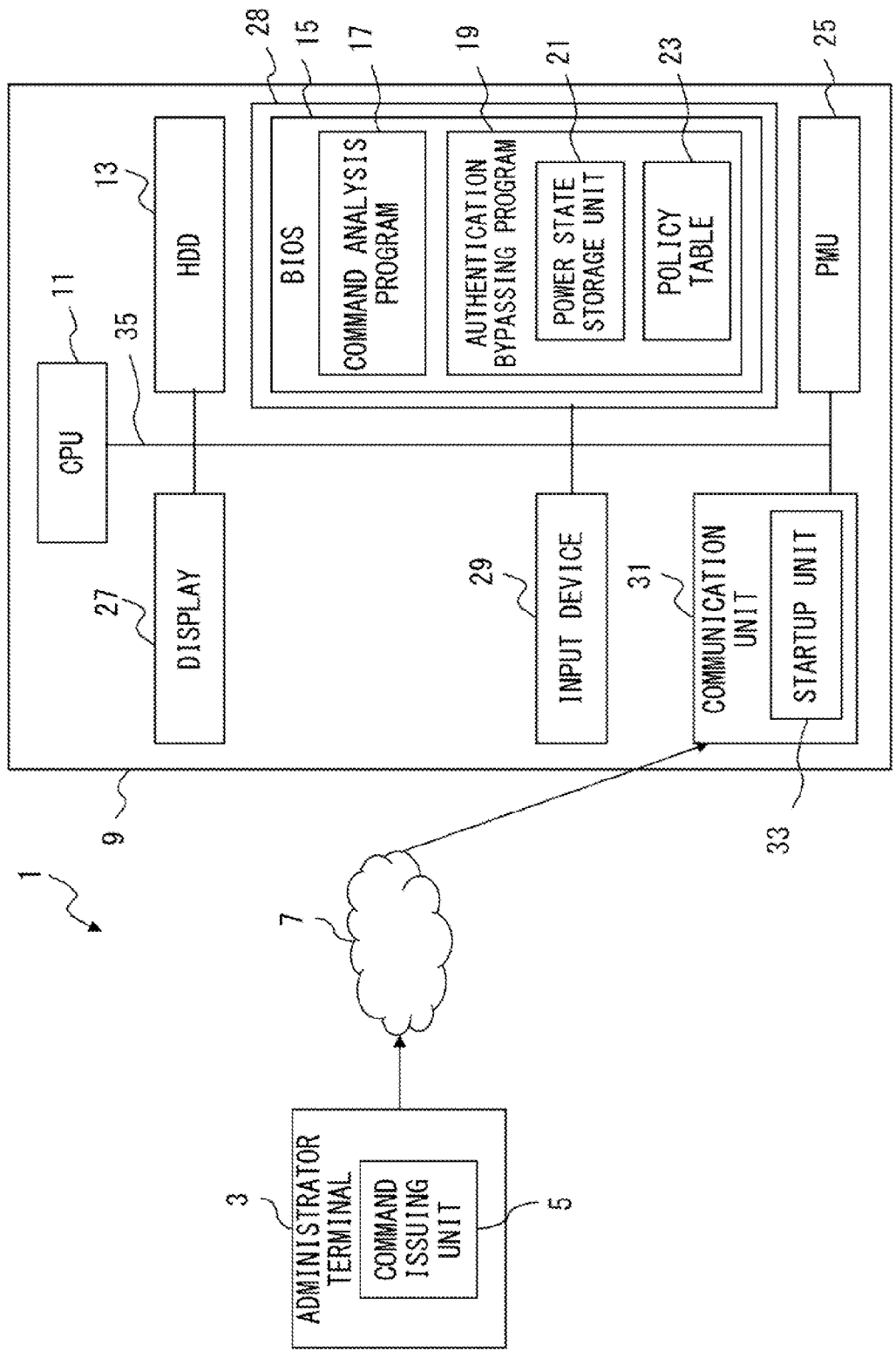
F I G. 1

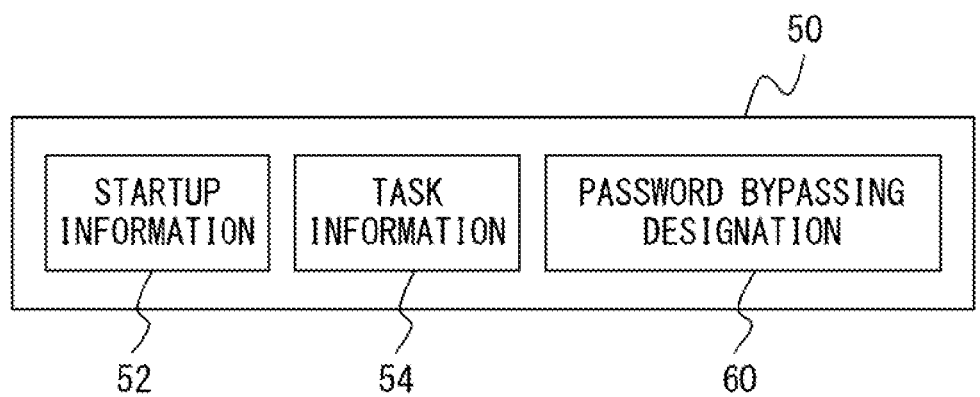
F I G. 2

| PASSWORD BYPASSING | BIOS AUTHENTICATION DESIGNATION | HDD AUTHENTICATION DESIGNATION | ENVIRONMENT AUTHENTICATION DESIGNATION |
|---|---|---|---|
| 1 | BIOS PW BYPASSING | HDD PW BYPASSING | ENVIRONMENT AUTHENTICATION BYPASSING |
| 0 | BIOS PW EXECUTION | HDD PW EXECUTION | ENVIRONMENT AUTHENTICATION EXECUTION |

FIG. 3

| POWER STATE | BIOS AUTHENTICATION DESIGNATION | HDD AUTHENTICATION DESIGNATION | ENVIRONMENT AUTHENTICATION DESIGNATION |
|---|---|---|---|
| S0 | AUTHENTICATION BYPASSING | AUTHENTICATION BYPASSING | AUTHENTICATION EXECUTION |
| S3 | — | — | AUTHENTICATION BYPASSING |
| S4 | AUTHENTICATION BYPASSING | AUTHENTICATION BYPASSING | AUTHENTICATION EXECUTION |
| S5 | AUTHENTICATION BYPASSING | AUTHENTICATION BYPASSING | AUTHENTICATION EXECUTION |

FIG. 5

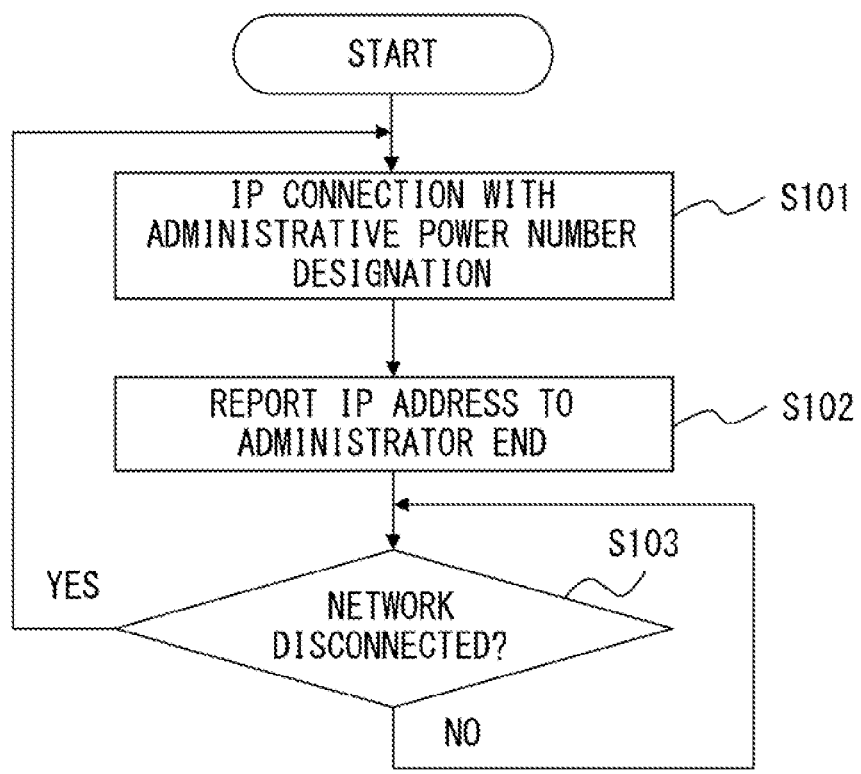
F I G. 6

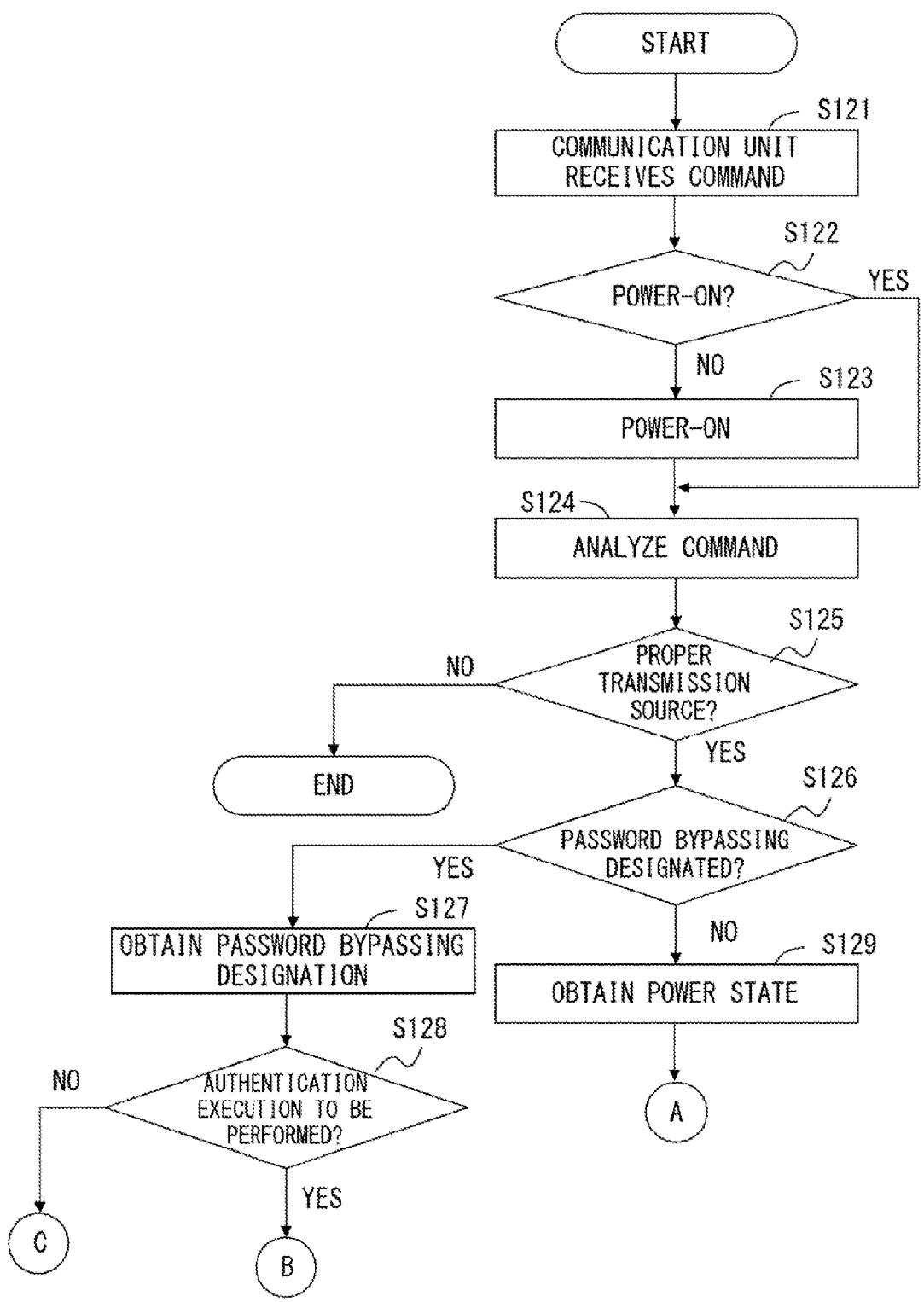
F I G. 7A

INFORMATION PROCESSING APPARATUS AND AUTHENTICATION BYPASSING METHOD

CROSS-REFERENCE TO RELATED APPLICATIONS

This application is based upon and claims the benefit of priority of the prior Japanese Patent Application No. 2011-076800, filed on Mar. 30, 2011, the entire contents of which are incorporated herein by reference.

FIELD

The embodiments discussed herein relate to an information processing apparatus and an authentication bypassing method.

BACKGROUND

In personal computers (hereinafter referred to as PCs), it is often the case that a BIOS password authentication and a hard disk (Hard Disk Drive: HDD) password authentication are set in the Basic Input Output System (BIOS) level. These can be set from a BIOS Setup window, and users who are authorized to enter the BIOS Setup can make their own password setting and authentication execution or non-execution setting. Setting and the use of the password are prescribed in the company policy of some companies from the viewpoint of security, and in operation with mobiles, in particular, execution of authentications are often recommended. In some cases, the password may be substituted with biometric authentications such as fingerprint authentication.

There are some cases in which activation of a PC by remote control via a network is required, including a case of maintenance of a PC by remote control. As a specification to do this, a function referred to as Wake on LAN (registered trademark: WOL) that enables a PC to be activated by remote control has been known. WOL is a function to turn on the power of computers through communication devices such as Local Area Networks (LANs).

In the operation of WOL, when an operator side transmits a magic packet to a communication device in a WOL-target computer, a network adapter of the WOL-target computer receives the packet and turns on the power of the PC. The magic packet system functions when 102-byte data including 0xffffffffffff (six bytes) and a MAC address (six bytes) of the network adapter of the WOL-target network, which is repeated 16 times, are received following the Internet Protocol (IP) header.

In a system using Integrated Circuit (IC) cards, when recording or updating of data representing a transaction amount is requested, records in an internal memory are referenced and authentication is bypassed, or authentication is executed on the basis of particular condition information.

There is an example of a system for managing a communication network that has plural devices connected and the system includes meta-network configuring means and meta-network terminating means. Here, the meta-network configuring means is means to virtually realize a meta-network and has an IP address distributing function to dynamically or statically assign IP addresses on the meta-network to plural devices when the plural devices perform communication operations. The meta-network terminating means includes a network terminating means IP bridge function and connects plural devices to the meta-network. In this system, even if there is no explicit authentication procedure in the devices at a user end, the user can be identified by referring to information accumulated in a database in the system.

Patent Document 1: Japanese Laid-open Patent Publication No. 2000-29962
Patent Document 2: Japanese Laid-open Patent Publication No. 2004-356861

SUMMARY

According to an aspect of the invention, the information processing apparatus is an information processing apparatus connected to a network. The information processing apparatus includes a main body, a communication unit, a power control unit, and a startup unit. The communication unit is capable of receiving a command transmitted over the network. The power control unit controls power supply to the information processing apparatus and supplies power to the communication unit regardless of a power state of the main body. The startup unit causes the power control unit to turn on power of the main body in response to reception of the command in the communication unit over the network.

Here, the main body includes a first control unit, a firmware storage unit, a first storage unit, a power state storage unit, and an authentication operation storage unit. The first control unit controls processing in the information processing apparatus. The firmware storage unit stores firmware to set an input or output operation of the information processing apparatus. The first storage unit stores an operating system of the information processing apparatus, and the first storage unit is capable of reading and writing information under control of the first control unit. The power state storage unit stores a power state of the main body immediately prior to reception of the command in the communication unit. The authentication operation storage unit stores an operation table indicating either authentication or authentication bypassing to be performed in accordance with the power state.

When the first control unit determines from analysis that the command does not include information relating to whether to perform authentication of the firmware or the first storage unit, the first control unit performs either authentication or authentication bypassing based on the power state and the operation table. When the first control unit determines from analysis that the command includes information relating to whether to perform authentication of the firmware or the first storage unit, the first control unit performs either authentication or authentication bypassing based on the information relating to whether to perform the authentication or not in the command.

According to another aspect, the authentication bypassing method is an authentication bypassing method for designating whether or not to perform authentication to an information processing apparatus including a main body, a communication unit to receive a command, a power control unit to control power supply, and a startup unit to start the main body over a network. Here, the communication unit receives a command transmitted over the network, and the power control unit starts the main body. The information processing apparatus analyzes the command and determines whether or not the command includes information to designate whether to perform or not to perform authentication of firmware to set an input and an output of the information processing apparatus and a first storage unit to store an operating system of the information processing apparatus.

The information processing apparatus performs authentication or authentication bypassing based on an operation table and a power state immediately prior to reception of the command in the main body when the command does not include the information to designate whether to perform or not to perform authentication of the firmware or the first storage unit. The operation table indicates either authentication or authentication bypassing to be performed in accordance with the power state. The information processing apparatus performs authentication or authentication bypassing based on the information indicating either authentication or authentication bypassing to be performed when the command includes the information to designate whether to perform or not to perform authentication of the firmware or the first storage unit.

The object and advantages of the invention will be realized and attained by means of the elements and combinations particularly pointed out in the claims.

It is to be understood that both the foregoing general description and the following detailed description are exemplary and explanatory and are not restrictive of the invention as claimed.

BRIEF DESCRIPTION OF DRAWINGS

FIG. 1 is a diagram illustrating the configuration of the authentication bypassing system according to the first embodiment;

FIG. 2 is a diagram illustrating a structure of a command according to the first embodiment;

FIG. 3 is a diagram illustrating a structure of authentication bypassing designation according to the first embodiment;

FIG. 5 is a diagram explaining the configuration of the policy table according to the first embodiment;

FIG. 6 is a flowchart illustrating the operations for receiving commands of the communication unit according to the first embodiment;

FIG. 7A is a flowchart illustrating the operations of the information processing apparatus according to the first embodiment;

DESCRIPTION OF EMBODIMENTS

Figure 4:
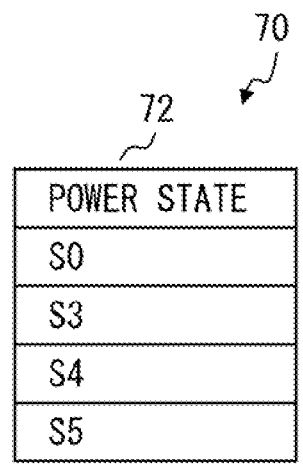
FIG. 4 is a table to explain the information stored in the power state storage unit according to the first embodiment.

The above-described conventional authentication method has the following problems.

In using WOL, users often change the setting to skip authentication in the BIOS Setup before use. This setting is stored as a specified state of the BIOS Setup and is reflected in the operations at the next activation and after. The skipping of authentication may involve deactivation of the authentication. In such a case, however, the authentication will not be executed in regular use, and therefore there remains a concern about insufficient security. In addition, the deactivation of authentication needs to be made by users.

In some cases, authentication is skipped only in a case of WOL. In this case, in using WOL, a user can reach a desktop window of Windows (Registered Trademark), for example, if a password for authentication is not set or if password bypassing is set. However, if the setting of password bypassing is not set in advance, the activation of the PC stops at a window of a BIOS password and an HDD password, and a service will not be available until the user directly inputs a password into the PC.

In addition, a system using IC cards that executes authentication bypassing when recording or updating of data is requested or that executes authentication based on particular condition information or a system to which plural devices are connected does not execute authentication bypassing in accordance with externally obtained conditions.

It should be noted that the above problems are not limited to the above authentication methods, but can occur in other methods that authenticate information processing apparatuss.

(First Embodiment)

In the following description, an authentication bypassing system 1 according to the first embodiment is explained with reference to the drawings. FIG. 1 is a diagram illustrating the configuration of the authentication bypassing system 1 according to the first embodiment, FIG. 2 is a diagram illustrating a structure of a command, and FIG. 3 is a diagram illustrating a structure of authentication bypassing designation. As illustrated in FIG. 1, the authentication bypassing system 1 is a system in which an administrator terminal 3 and plural information processing apparatuss 9 (only one of the devices is illustrated in FIG. 1) are connected over a wired or wireless network 7. The network 7 may be the Internet, a LAN or the like. The administrator terminal 3 is an information processing apparatus such as a personal computer (PC) and has a command issuing unit 5. In the command issuing unit 5, a controller unit that is not illustrated in the drawings executes reading a program for issuing commands so as to issue commands to designate operations that the information processing apparatus 9 performs at an arbitrary time.

As illustrated in FIG. 2, a command 50 issued by the administrator terminal 3 is information including a designation to be given to the information processing apparatus 9, and includes startup information 52, task information 54, and a password bypassing designation 60. The startup information 52 is information indicating the startup of the information processing apparatus 9, and the task information 54 is information of processing executed after the startup of an operating system (OS) in the information processing apparatus 9. The password bypassing designation 60 is information including designation of whether authentication in the information processing apparatus is to be performed or not. It should be noted that the password bypassing designation 60 is not always included in the command 50.

As illustrated in FIG. 3, the password bypassing designation 60 is information indicating a BIOS authentication designation 64, an HDD authentication designation 66, and an environment authentication designation 68 in the information processing device 9. In each of the above designations, "1" is assigned in a case of a bypassing password (PW) (authentication bypassing) and "0" is assigned in a case of an executing password (authentication execution). In other words, the password bypassing designation 60 is for example represented by three-bit information in the manner of "000" when the authentication is performed on all three of the items, i.e., BIOS, HDD, and environment, and in the manner of "111" when the authentication is bypassed for all of the items.

Here, the BIOS authentication is a password authentication, for example, to execute BIOS, and is a processing set to drive the BIOS when a preregistered password and the input password match. The HDD authentication is a password authentication to drive HDD and is a processing set to drive the HDD when the preregistered password and the input password match.

The environment authentication is authentication relating to a position at which the information processing apparatus 9 is placed. An example of the environment authentication is that position information (latitude, longitude, and the like) at which the startup of the information processing apparatus 9 is permitted is stored in the information processing apparatus 9 in advance.

It is possible that the position information of the information processing apparatus 9 is obtained in the BIOS level every time the information processing apparatus 9 starts. At that time the information processing device 9 compares the position information obtained from the position acquisition means not illustrated in the drawing with the startup-permitted position information, and when the two match one another, an authentication to carry the processing forward, such as permitting the startup of the main body of the information processing apparatus 9, is performed.

Another example is such that it is possible to use information of a base station for communications, information of available access points, movement history of the information processing apparatus 9, and images recording the surroundings of the place at which the startup is permitted as the position information.

The command 50 is reported to a communication unit 31 of the information processing apparatus 9 over communication networks such as 3$^{rd}$ generation (3G), Personal Handy System (PHS), LAN, Wireless Fidelity (WiFi), and Worldwide Interoperability (WiMAX). Transmission of the command uses a short message service (SMS) and a pseudo-PUSH for transmitting a push message in a state in which an IP network is spread.

In FIG. 1, the information processing apparatus 9 is an information processing apparatus such as a PC having its operations controlled by a central processing unit (CPU) 11. The information processing apparatus 9 further includes an HDD 13, a memory 28, a power management unit (PMU) 25, a display 27, an input device 29, and a communication unit 31, and these are connected to one another by a system bus 35.

The CPU 11 is an arithmetic processing unit for executing processing in the information processing apparatus 9 by executing reading of a program from the HDD 13, the memory 28 or the like. The HDD 13 is, for example, a storage device including a hard disk that is a storage medium and its driving device, and is a device to store various control programs such as an operating system (OS) executed by the CPU 11 and the acquired data. The CPU 11 performs various kinds of control processing by reading and executing a prescribed control program recorded in the HDD 13 through the storage medium driving device.

The memory 28 is, for example, read only memory (ROM) or random access memory (RAM). The memory 28 is a storage device for storing in advance programs to control the operations of the information processing apparatus 9 or being used as a work area if necessary to execute the programs. The memory 28 stores a BIOS 15, a command analysis program 17, an authentication bypassing program 19, and the like.

The BIOS 15 is firmware for setting input/output of the information processing apparatus 9. The BIOS 15 includes the command analysis program 17 and the authentication bypassing program 19. The command analysis program 17 is a program to analyze a received command and to verify the transmission source. The authentication bypassing program 19 has a power state storage unit 21, and a policy table 23. The authentication bypassing program 19 is a program to perform authentication or authentication bypassing on the three items of the BIOS, the HDD, and the environment, in accordance with the content of the command from the administrator terminal 3, the power state storage unit 21, and the policy table 23.

The power state storage unit 21 stores the power state of a portion of the information processing apparatus 9 other than the communication unit 31 and the PMU 25 (hereinafter referred to as the main body of the information processing apparatus 9). The stored power state is a power state immediately prior to the reception of a command in the communication unit 31. The policy table 23 is an operation table indicating whether or not an authentication is performed or not in accordance with the power state. Here, the power state storage unit 21 and the policy table 23 are explained.

FIG. 4 is a table to explain the information stored in the power state storage unit 21. As illustrated in FIG. 4, the power state storage unit 21 stores any of the power states S0, S3, S4, and S5 that indicate possible power states of the information processing apparatus 9 as the power state 70 of the information processing apparatus 9. Here, the power state is defined in the Advanced Configuration and Power Interface (ACPI). According to the definition, the power state S0 represents a state of power-on, the power state S3 represents a standby state, the power state S4 represents a hibernated state, and the power state S5 represents a state of power-off.

FIG. 5 is a diagram explaining the configuration of the policy table 23. As illustrated in FIG. 5, the policy table is information indicating either the authentication designation or the authentication bypassing designation in accordance with the power states S0, S3, S4, and S5. The authentication or the authentication bypassing is designated in accordance with the authentication bypassing ("1") or the authentication execution ("0") of the BIOS authentication designation 84, the HDD authentication designation 86, and the environment authentication designation 88.

As an example, the setting is made such that in a case of the power state S0, i.e., when the main body of the information processing apparatus 9 is power-on, authentications other than the environment authentication are bypassed. In a case of the power state S3, the BIOS and HDD authentications are unnecessary in the system and are therefore not set, and the environment authentication is set to the authentication bypassing. In cases of the power states S4 and S5, i.e., when the information processing apparatus 9 is hibernated or power-off, the setting is to bypass the authentications other than the environment authentication. The policy table 23 may be set in advance at the time of product shipment, may be set by an administrator by remote control, or may be set by other methods.

The PMU 25 is a device for controlling power supply to the entire information processing apparatus 9 and is configured to operate even if the main body of the information processing apparatus 9 is in a sleep state, to connect the communication unit 31 and the power source that is not illustrated in the drawing at all times, and to supply power to the communication unit 31. The PMU 25 supplies the power to the main body of the information processing apparatus 9 when the communication unit 31 receives a command.

The display 27 is a device for displaying the processing result of the information processing apparatus 9. For example, the display 27 displays text and images in response to the display data sent from the CPU 11.

The input device 29 is a device for, when being operated by a computer user, obtaining inputs of various kinds of information from the user corresponding to the operation content, and sending the obtained input information to the CPU 11, and the input device 29 includes, for example, a keyboard device and a mouse device.

The communication unit 31 is an interface device for managing an exchange of the various kinds of data with the outside world through a wired or wireless network. In the communication unit 31, the power is supplied even if the main body of the information processing apparatus 9 is in the sleep state, so that commands can be received. Moreover, the communication unit 31 has a startup unit 33. When a command is received, the startup unit 33 starts the main body of the information processing apparatus 9 by reporting the reception to the PMU 25. The bus 310 is a communication path for connecting each of the above devices with each other and for exchanging data. The above-described information processing apparatus 9 operates in response to the CPU 11 reading and executing the BIOS 15, the command analysis program 17, the authentication bypassing program 19, and the like.

Figure 7B:
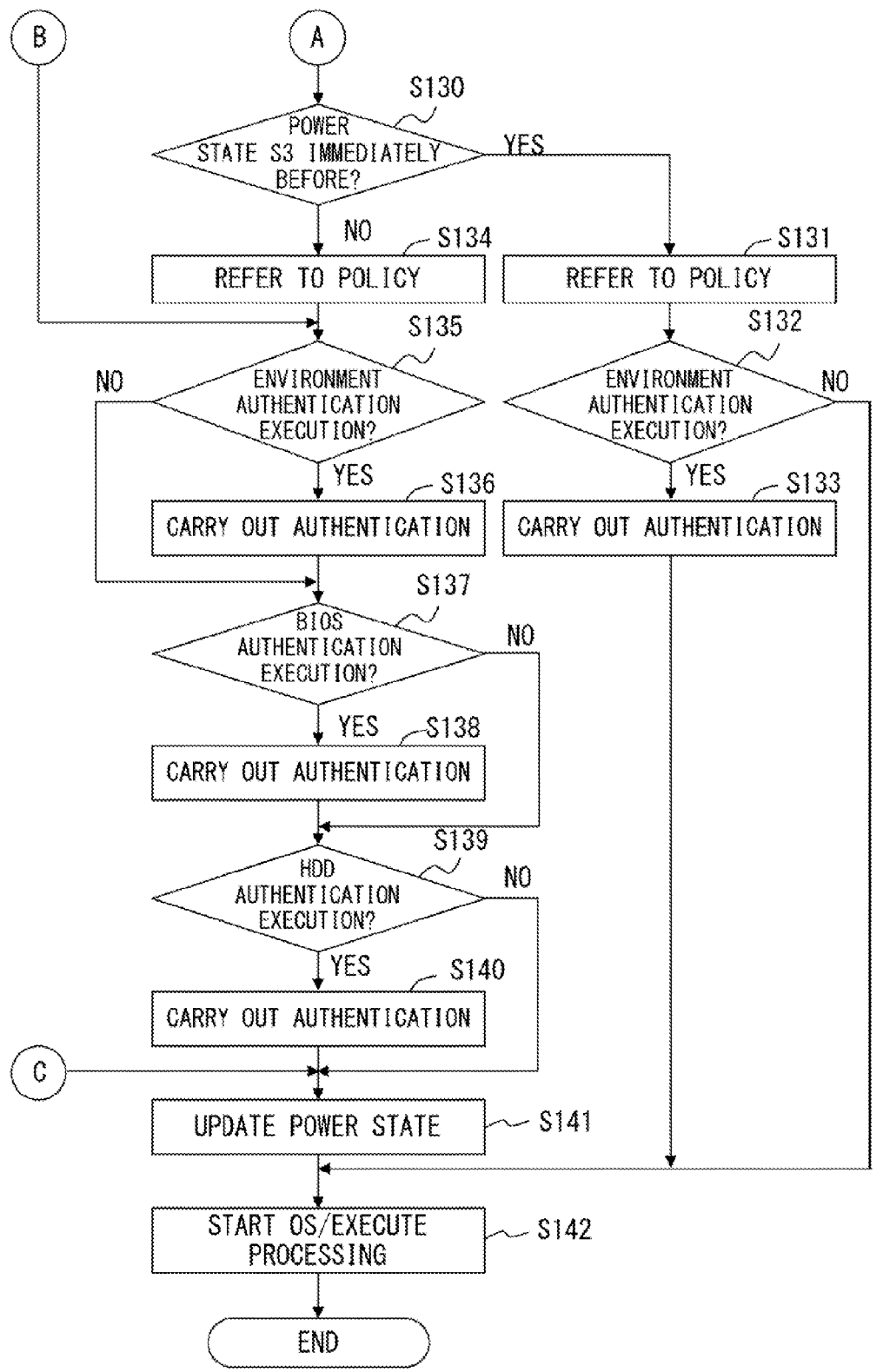
FIG. 7B is a flowchart illustrating the operations of the information processing apparatus according to the first embodiment.

In the following description, operations of the authentication bypassing system 1 according to the first embodiment, which is configured as above, are explained with reference to FIG. 6, FIG. 7A, and FIG. 7B. FIG. 6 is a flowchart illustrating the operations for receiving commands of the communication unit 31, and FIG. 7A and FIG. 7B are flowcharts illustrating the operations of the information processing apparatus 9.

As illustrated in FIG. 6, the communication unit 31 monitors whether or not a command is transmitted from the administrator terminal 3 at all times. In other words, the communication unit 31 makes an IP (Internet Protocol) connection to the network 7 with an administrative port number designation (S101). The communication unit 31 reports the IP address to the administrator terminal 3 (S102). Furthermore, the communication unit 31 determines whether the connection with the network 7 is disconnected or not (S103), repeats S103 while the connection is maintained (S103: NO), and returns to S101 when the connection is disconnected (S103: YES). At that time, the command 50 is transmitted to the communication unit in the information processing apparatus 9 from the administrator terminal 3 by the pseudo-PUSH, for example.

As illustrated in FIG. 7A, in the information processing apparatus 9, when the communication unit 31 receives a command (S121), the startup unit 33 reports the reception to the PMU 25 and, if the power is not ON (S122: NO), applies power to the main body of the information processing apparatus 9 through the PMU 25 (S123). Afterwards, the CPU 11 moves the processing on to S124. If the main body of the information processing apparatus 9 is power-on (S122: YES), the CPU 11 moves the processing on to S124 without any change.

The CPU 11 reads the command analysis program 17 in the BIOS 15 and analyzes the received command (S124). The CPU 11 determines (S125) whether or not the command is from a proper transmission source, or in this case from the administrator terminal 3. At that time, it is preferable to store information indicating the proper transmission source in the memory 28 or the like. If the transmission source is determined to be improper (S125: NO), the processing is terminated.

When the transmission source is determined to be proper (S125: YES), the CPU 11 determines whether or not the command has the password bypassing designation 60 (S126). In the absence of the password bypassing designation 60 (S126: NO), the processing proceeds to S129.

In the presence of the password bypassing designation 60, the CPU 11 obtains the analyzed password bypassing designation 60 (S127). The CPU 11 reads the authentication bypassing program 19 and determines whether or not there is a "0" in the obtained password bypassing designation 60. In other words, the CPU 11 determines if any one of the BIOS authentication designation 64, the HDD authentication designation 66, and the environment authentication designation 68 in the password bypassing designation 60 designates the authentication execution (S128).

The CPU 11 moves the processing on to S141 when it determines that none of the BIOS authentication designation 64, the HDD authentication designation 66, and the environment authentication designation 68 designates the authentication execution (S128: NO). When any of the BIOS authentication designation 64, the HDD authentication designation 66, and the environment authentication designation 68 designates the authentication execution (S128: YES), the CPU 11 moves the processing on to S135, and performs the authentication in accordance with the password bypassing designation 60.

When the password bypassing designation 60 is determined to be absent in S126, the CPU 11 obtains the power state from the power state storage unit 21 (S129). At that time, the power state is a power state immediately prior to the reception of a command in the communication unit 31.

FIG. 7B is now referenced. The CPU 11 determines whether the obtained power state is the power state S3 or not (S130). When the power state is the power state S3 (S130: YES), the CPU 11 refers to the policy table 23 (S131) and determines whether the environment authentication is designated or not in the environment authentication designation 68 (S132). The CPU 11, when it determines that execution of the environment authentication is designated (S132: YES), executes the authentication (S133), and when it determines that execution of the environment authentication is not designated (S132: NO), it bypasses the authentication and moves the processing on to S141.

When the power state is not the power state S3 (S130: NO), the CPU 11 refers to the policy table 23 (S134). The CPU determines whether the environment authentication is designated or not in the environment authentication designation 68 or the environment authentication designation 88 (S135). The CPU 11, when it determines that the execution of the environment authentication is designated (S135: YES), executes the authentication (S136) and moves the processing on to S137, and when it determines that the execution of the environment authentication is not designated (S135: NO), bypasses the authentication and moves the processing on to S137. Here, the password for the authentication may be input on the side of information processing apparatus 9, or may be input on the side of the administrator terminal 3.

In S137, the CPU 11 determines whether the BIOS authentication is designated or not in the BIOS authentication designation 64 or the BIOS authentication designation 84. The CPU 11, when it determines that execution of the BIOS authentication is designated (S137: YES), executes the authentication (S138), moves the processing on to S139, and when it determines that the execution of the BIOS authentication is not designated (S137: NO), the CPU 11 bypasses the authentication and moves the processing on to S139.

In S139, the CPU 11 determines whether the HDD authentication is designated or not in the HDD authentication designation 66 or the HDD authentication designation 86. The CPU 11, when it determines that execution of the HDD authentication is designated (S139: YES), executes the authentication (S140), moves the processing on to S141, and when it determines that the execution of the HDD authentication is not designated (S139: NO), the CPU 11 bypasses the authentication and moves the processing on to S141.

The CPU 11 updates the power state to the current power state in the power state storage unit 21 (S141), starts the OS, and executes the processing designated in the task information 54 (S142). From this point forward, it is preferable that the power state be updated at every change in the power state of the main body of the information processing apparatus 9 until the next command 50 is received.

As explained above, according to the authentication bypassing system 1 of the first embodiment, the information processing apparatus 9 is set to a state in which the power is supplied to the communication unit 31 at all times so that commands can be received over the network 7. The communication unit 31 has the startup unit 33, and starts the main body of the information processing apparatus 9 through the PMU 25 in response to the reception of a command including the startup information 52.

The CPU 11 reads the command analysis program 17 and analyzes the command, reads the authentication bypassing program 19 in the absence of the password bypassing designation 60, and executes or bypasses the BIOS authentication, the HDD authentication, or the environment authentication in accordance with the power state. In the presence of the password bypassing designation 60, the CPU 11 executes or bypasses the authentications in accordance with the designation.

As described above, according to the authentication bypassing system 1 of the first embodiment, even if the main body of the information processing apparatus 9 is not started, by transmitting the command 50 from the administrator terminal 3, it is possible to start the information processing apparatus while designating by remote control whether the authentication is executed or not. At that time, it is possible to selectively designate whether to execute or to bypass the BIOS authentication, the HDD authentication, or the environment authentication on the side of the information processing apparatus 9 in accordance with the power state of the information processing apparatus 9 on the basis of the policy table 23. It is possible to selectively designate execution or bypassing of the authentications from the administrator terminal 3 if the administrator terminal 3 includes the password bypassing designation 60 in a command.

As a result, temporary authentication bypassing can be made by designating password bypassing by remote control without the need for manual setting of the BIOS setup setting in plural authentication means. Accordingly, it is possible to realize the improvement of safety in startup and authentication control by remote control. In this manner, according to the authentication bypassing system 1, it is possible to selectively designate execution or bypassing of the authentication at the time of startup of the information processing apparatus 9 by remote control. Therefore, administration of the information processing apparatus can be performed by remote control while keeping the device in a safe state when the authentication bypassing is not designated. In addition, by including the task information 54 in the command 50, it is possible to execute prescribed processing after the startup by remote control.

(Second Embodiment)

Next, an authentication bypassing system 200 of the second embodiment is explained with reference to FIG. 8, FIG. 9A, and FIG. 9B. In the second embodiment, the redundant explanations of the configurations and operations that are the same as those of the first embodiment are omitted.

Figure 8:
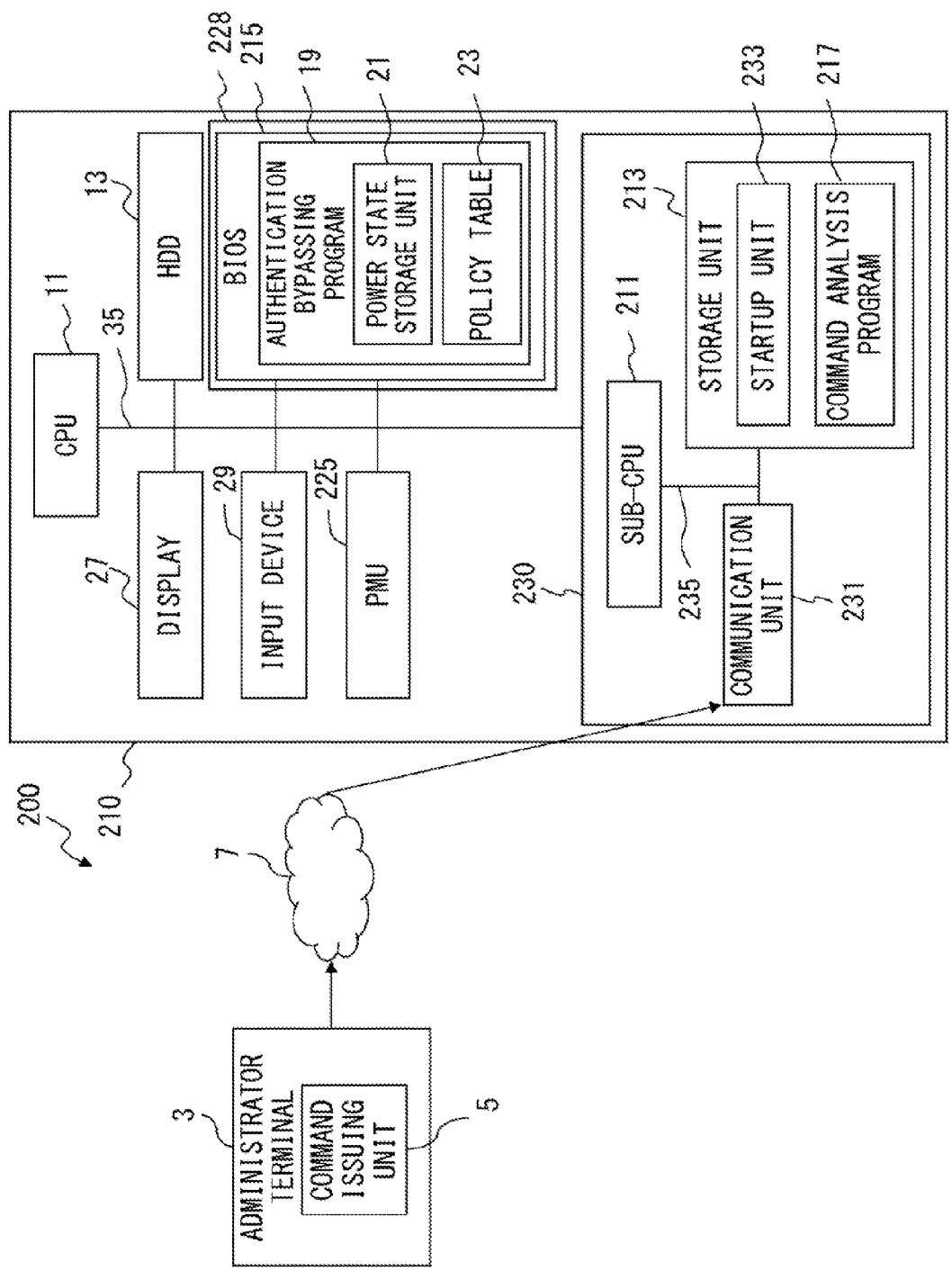
FIG. 8 is a diagram illustrating a configuration of the authentication bypassing system according to the second embodiment.

FIG. 8 is a diagram illustrating a configuration of the authentication bypassing system 200 according to the second embodiment. As illustrated in FIG. 8, in the authentication bypassing system 200, an administrator terminal 3 and an information processing apparatus 21 are connected over a network 7. The command transmitted from the administrator terminal 3 is the same as the command 50 in the first embodiment.

The information processing apparatus 210 has a CPU 11, a HDD 13, a memory 228, a PMU 225, a display 27, an input device 29, and a communication analysis unit 230, which are connected with one another by a system bus 35. The information processing apparatus 210 is, for example, an information processing apparatus such as a PC. In comparison with the information processing apparatus 9, the information processing apparatus 210 includes a BIOS 215 instead of the BIOS 15, and the communication analysis unit 230 instead of the communication unit 31. Although the BIOS 215 has an authentication bypassing program 19 similarly to the BIOS 15, the BIOS 215 does not have a command analysis program 17. In the following description, a portion of the information processing apparatus 210 other than the communication analysis unit 230 and the PMU 225 is referred to as a main body of the information processing apparatus 210.

The communication analysis unit 230 has a sub-CPU 211, a storage unit 213, and a communication unit 231, which are connected to one another by the system bus 235. The storage unit 213 has a startup program 233 and a command analysis program 217.

In the second embodiment, the power is supplied to the communication analysis unit 230 by the control of the PMU 225 regardless of whether the main body of the information processing apparatus 210 is in a sleep state or not. The sub-CPU 211 performs processing in the communication analysis unit 230 by reading and executing a program from the storage unit 213. The communication unit 231 receives a command delivered over the network 7. The startup program 233 is executed by being read by the sub-CPU 211, and the sub-CPU 211 causes the PMU 225 to start the main body of the information processing apparatus 210. The sub-CPU 211 analyzes the command received by the communication unit 231 by reading and executing the command analysis program 217.

It should be noted that the storage unit 213 may store the power state of the main body of the information processing apparatus 9. At that time, the sub-CPU 211 confirms the power state in the storage unit 213 when the communication unit 231 receives a command and starts the main body of the information processing apparatus 9, if the main body is not in the power-on state.

The operations of the authentication bypassing system 200 with the above-explained configuration are explained with reference to FIG. 9A and FIG. 9B. Since the operations to receive a command from the administrator terminal 3 in the communication unit 231 are the same as the operations explained with reference to FIG. 6, the explanation of those operations is omitted.

Figure 9A:
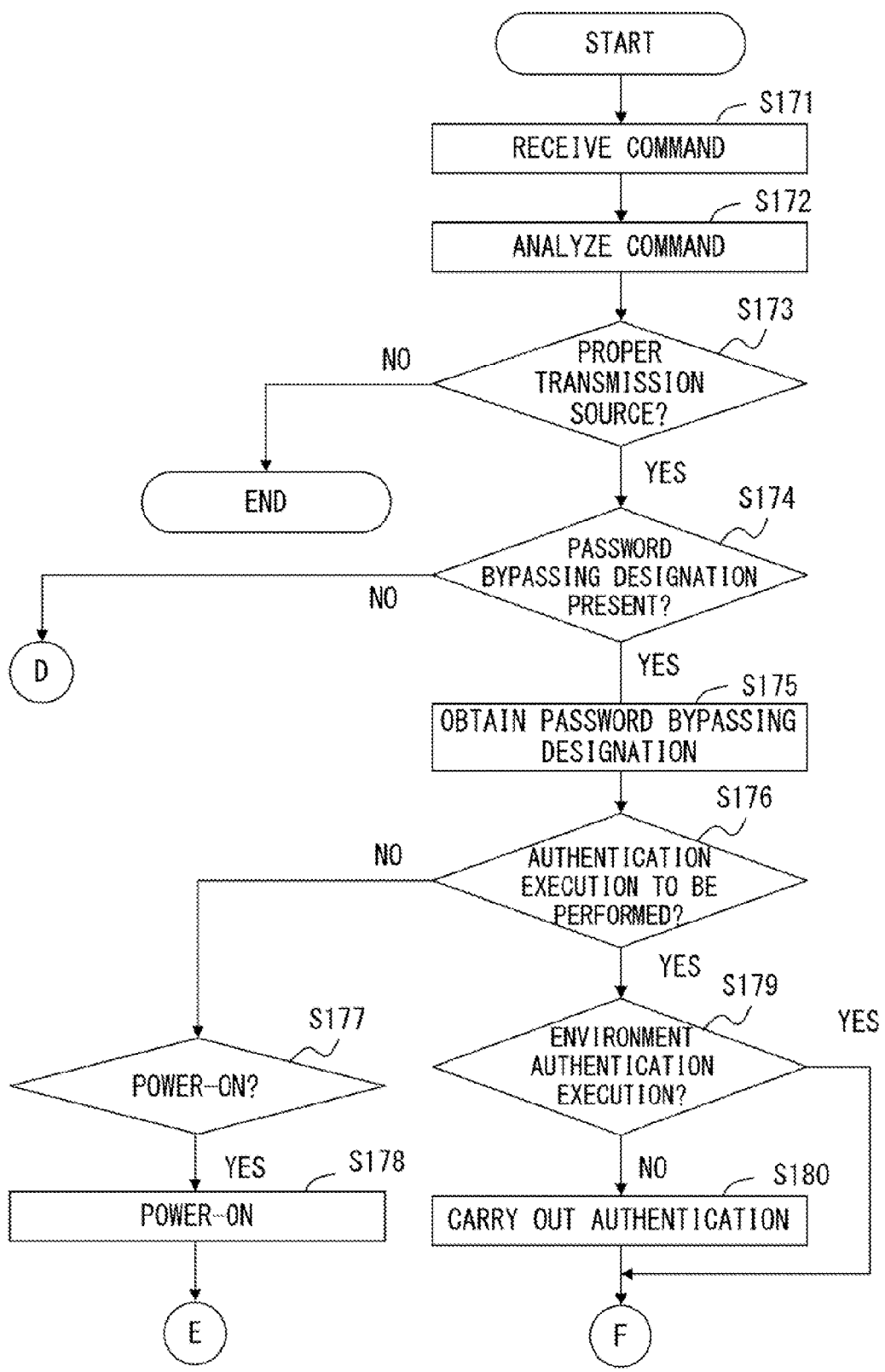
FIG. 9A is a flowchart illustrating the operations of the information processing apparatus according to the second embodiment.
Figure 9B:
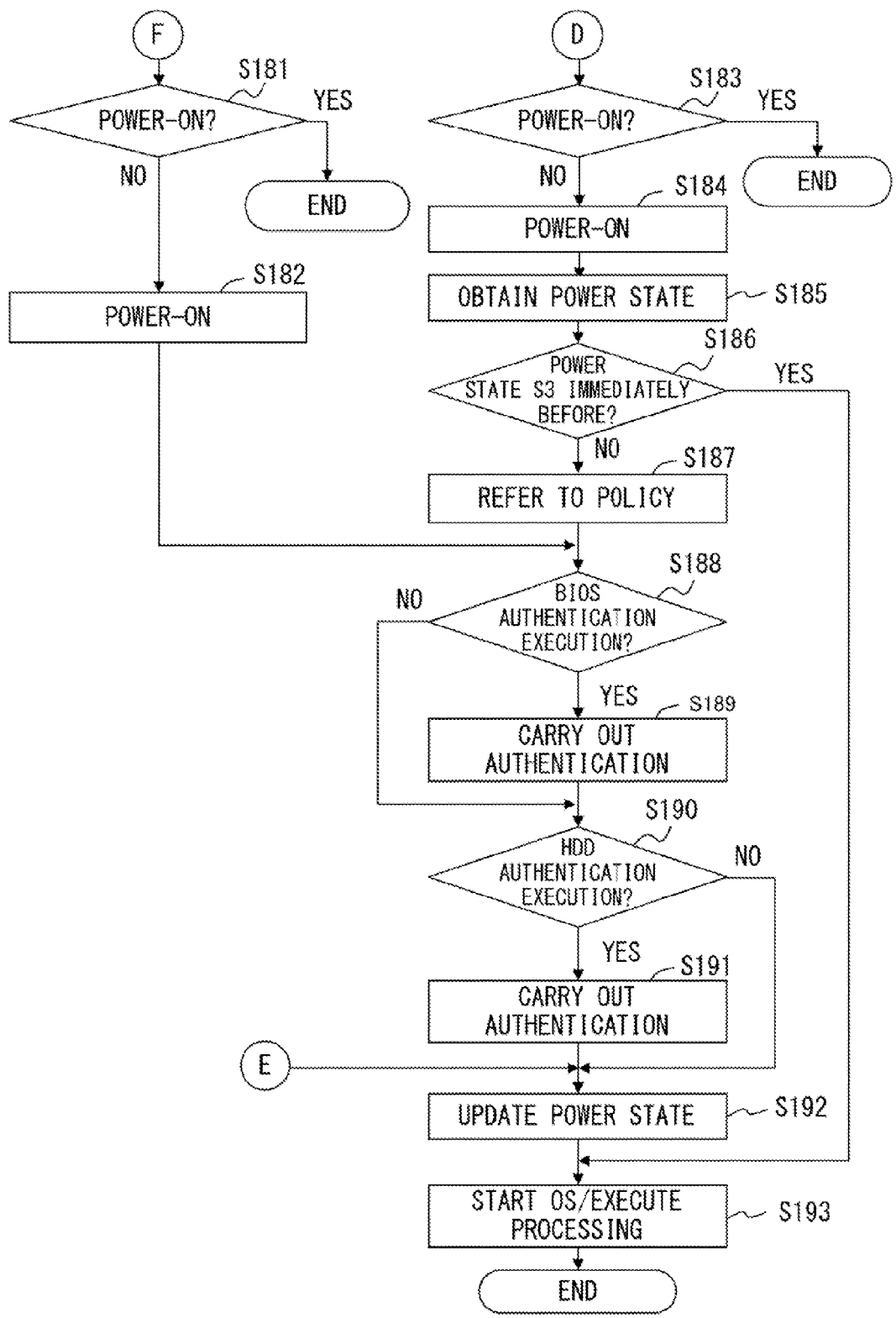
FIG. 9B is a flowchart illustrating the operations of the information processing apparatus according to the second embodiment.

FIG. 9A and FIG. 9B are flowcharts illustrating the operations of the information processing apparatus 210. As illustrated in FIG. 9A, in the information processing apparatus 210, when the communication unit 231 receives a command (S171), the sub-CPU 211 detects the reception of a command. The sub-CPU 211 analyzes the received command by reading and executing the command analysis program 217 in the storage unit 213 (S172). The sub-CPU 211 determines whether or not the command is from a proper transmission source, or in this case from the administrator terminal 3 (S173). If the transmission source is determined to be improper (S173: NO), the processing is terminated.

In S173, when the command is the transmission source confirmed to be proper (S173: YES), the sub-CPU 211 determines whether the command includes a password bypassing designation 60 or not (S174). In the absence of the password bypassing designation 20 (S174: NO), the sub-CPU 211 moves the processing on to S183.

In the presence of the password bypassing designation 60, the sub-CPU 211 obtains the password bypassing designation 60 (S175). In other words, the sub-CPU 211 determines if any one of the BIOS authentication designation 64, the HDD authentication designation 66, and the environment authentication designation 68 in the password bypassing designation 60 designates the authentication execution (S176). When all of the BIOS authentication designation 64, the HDD authentication designation 66, and the environment authentication designation 68 in the password bypassing designation 60 designates authentication bypassing, i.e., "1", (S176: NO), the sub-CPU 211 determines whether or not the main body of the information processing apparatus 210 is in a power-on state by the PMU 225 (S177).

When the main body of the information processing apparatus 210 is power-on (S177: YES), the sub-CPU 211 terminates processing relating to the authentication execution or the authentication bypassing. When the main body of the information processing apparatus 210 is power-off (S177: NO), the sub-CPU 211 causes the PMU 225 to turn on the power of the main body of the information processing apparatus 210 (S178), and the processing proceeds to S192.

When any of the BIOS authentication designation 64, the HDD authentication designation 66, and the environment authentication designation 68 in the password bypassing designation 60 designates the authentication execution, i.e., any one of the designations is "0" (S176: YES), and the sub-CPU 211 proceeds the processing to S179. In S179, the sub-CPU 211 refers to the password bypassing designation 60 and confirms firstly with the environment authentication designation 68 as to whether the environment authentication is executed or not.

The sub-CPU 211, when it determines that the execution of the environment authentication is designated (S179: YES), executes the authentication (S180), and when it determines that the execution of the environment authentication is not designated (S179: NO), bypasses the authentication, and moves the processing on to S181. At that time, it is preferable for means to obtain data relating to the environment authentication, which is not illustrated in the drawing, to be provided in the communication analysis unit 230 to obtain position information and the like. Reference data to be referred to in the environment authentication is preferably stored in the storage unit 213 of the communication analysis unit 230.

The drawing to be referred to is now FIG. 9B. The sub-CPU 211 determines whether the main body of the information processing apparatus 210 is in a power-on state or not by the PMU 225 (S181). If the main body of the information processing apparatus 210 is power-on, the processing relating to the authentication or the authentication bypassing is terminated (S181: YES). If the main body of the information processing apparatus 210 is in a power-off state (S181: NO), the sub-CPU 211 causes the PMU 225 to turn on the power of the main body of the information processing apparatus 210 (S182) and moves the processing on to S188.

The reference now returns to S174, and in the absence of the password bypassing designation 60 (S174: NO), in S183, the sub-CPU 211 determines whether the power of the main body of the information processing apparatus 210 is on or not through the PMU 225 and, if the main body is in a power-on state (S183: YES), terminates the processing of the authentication execution or the authentication bypassing. If the main body is in a power-off state (S183: NO), the sub-CPU 211 reports the power-off to the PMU 225 and causes the PMU 225 to turn on the power of the main body of the information processing apparatus 210 (S184). When the power is supplied to the main body of the information processing apparatus 210, the CPU 11 reads and executes the authentication bypassing program 19 to obtain the power state from the power state storage unit 21 (S185).

In S186, the CPU 11 determines whether or not the power state is the power state S3 or not. When the power state is in the power state S3 (S186: YES), the CPU 11 bypasses the authentication and moves the processing on to S192. When the power state is not the power state S3 (S186: NO), the CPU 11 refers to the policy table 23 (S187). The CPU 11 determines whether or not the BIOS authentication is designated with reference to the BIOS authentication designation 84.

The CPU 11, when it determines that the BIOS authentication execution is designated (S188: YES), executes the authentication (S189) and moves the processing on to S190, and when it determines that the execution of the BIOS authentication is not designated (S188: NO), bypasses the authentication and moves the processing on to S190.

In S190, the CPU 11 refers to the HDD authentication designation 86 and determines whether or not the HDD authentication is designated. The CPU 11, when it determines that the execution of HDD authentication is designated (S190: YES), executes the authentication (S191) and moves the processing on to S192, and when it determines that the execution of HDD authentication is not designated (S190: NO), bypasses the authentication and moves the processing on to S192.

The CPU 11 updates the power state to the current power state in the power state storage unit 21 (S192), starts the OS, and performs processing designated by the task information 54 (S193). It is preferable for the power state to be updated at every change in the power state of the main body of the information processing apparatus 210 until the next command 50 is received.

As described above, according to the authentication bypassing system 200 of the second embodiment, the information processing apparatus 210 is set to a state in which the power is supplied to the communication analysis unit 230 including the communication unit 231 at all times so that commands can be received over the network 7. When the communication unit 231 receives a command, the sub-CPU 211 detects the reception.

The sub-CPU 211 analyzes the received command by reading and executing the command analysis program 217, and if the command is from a proper transmission source, the sub-CPU 211 determines whether the command includes password bypassing designation 60 or not. The sub-CPU 211 causes the PMU 225 to supply power to the main body of the information processing apparatus 210 if the command does not include the password bypassing designation 60, and executes or bypasses the BIOS authentication and the HDD authentication in accordance with the power state. When the password bypassing designation 60 is included, the power is turned on when all authentications are to be bypassed and the main body of the information processing apparatus 210 is not in a power-on state. In a power-on state, the state is maintained.

If any authentication execution is designated in the password bypassing designation 60, the CPU 11 performs authentication operations of the environment authentication in accordance with the password bypassing designation 60 and also performs the BIOS authentication and the HDD authentication. Here, in the absence of the password bypassing designation 60, only the BIOS authentication and the HDD authentication are performed in accordance with the power state. However, it is possible to modify the setting to perform the environment authentication regardless of the presence or absence of the password bypassing designation 60 and the other authentications in accordance with the power state.

According to the authentication bypassing system 200 of the second embodiment as described above, in addition to the advantage obtained from the authentication bypassing system 1 of the first embodiment, the sub-CPU 211 interprets a command, and in response to the result, the power of the information processing apparatus 210 can be turned on. Therefore it is possible for the sub-CPU 211 to analyze whether the command is from a proper transmission source or not before turning on the power of the information processing apparatus 210.

In addition, since the sub-CPU 211 of the communication analysis unit 230 determines whether the password bypassing designation 60 is present or not, it is possible to perform the environment authentication before turning on the power of the main body. In this manner, it is possible to omit the operations of turning on the power when the operations of turning on the power of the main body of the information processing apparatus 210 are not necessary, so as to be able to save power, and it is also possible to avoid safety deterioration of the authentications that are caused by turning on the power of the main body of the information processing apparatus 210.

In the above-described first and second embodiments, the PMU 25 and 225 are an example of the power control unit of the present invention, the CPU 11 is an example of the first control unit of the present invention, the BIOS 15 and 215 are an example of firmware of the present invention, and the HDD 13 is an example of the first storage unit of the present invention. The memories 28 and 228 are an example of the firmware storage unit, the power state storage unit, and the authentication operation storage unit of the present invention.

It should be noted that the transmission of commands may be performed by other methods such as Short Message Service (SMS) as long as the command can be received even though the main body of the information processing apparatus 9 and the main body of the information processing apparatus 210 are in the sleep state.

The firmware driving the information processing apparatus 9 and the information processing apparatus 210 is explained with an example of the BIOS. However the firmware may be others such as Extensive Firmware Interface (EFI). The storage device for storing the OS is explained with an example of the HDD. However, the storage device is not limited to the HDD, but may be an external storage unit of other modes.

The determination of the proper transmission source may include, for example, processing in which the content of the command may be encrypted in advance and whether the command can be decrypted or not is verified and processing to include information for authentication of the transmission source in the command.

When the password bypassing designation 60 is included in the command 50 from the administrator terminal 3, the authentication operations are to be performed based on the password bypassing designation 60. It is also possible that the password bypassing designation 60 include only the information of whether to perform authentication or not, and when the authentication is executed, the authentication operations are always performed in accordance with the policy table 23 set on the side of the information processing apparatus 9. The policy table 23 is not limited to the above example but may be based on other policies. Furthermore, the authentication is not limited to the methods using passwords, but may be other methods such as biometric authentication.

All examples and conditional language recited herein are intended for pedagogical purposes to aid the reader in understanding the invention and the concepts contributed by the inventor to furthering the art, and are to be construed as being without limitation to such specially recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus connected to a network, the information processing apparatus comprising:
   a main body;
   a communication unit capable of receiving a command transmitted over the network;
   a power control unit configured to control power supply to the information processing apparatus and to supply power to the communication unit regardless of a power state of the main body; and
   a startup unit configured to cause the power control unit to turn on power of the main body in response to reception of the command in the communication unit over the network,
   wherein the main body comprises:
   a first control unit configured to control processing in the information processing apparatus;
   a firmware storage unit configured to store firmware to set an input or output operation of the information processing apparatus;
   a first storage unit configured to store an operating system of the information processing apparatus, the first storage unit being capable of reading and writing information under control of the first control unit;
   a power state storage unit configured to store a power state of the main body immediately prior to reception of the command in the communication unit; and
   an authentication operation storage unit configured to store an operation table indicating either authentication or authentication bypassing to be performed in accordance with the power state,
   wherein when the first control unit determines from analysis that the command does not include information relating to whether to perform authentication of the firmware or the first storage unit, the first control unit performs either authentication or authentication bypassing based on the power state and the operation table, and
   when the first control unit determines from analysis that the command includes information relating to whether to perform authentication of the firmware or the first storage unit, the first control unit performs either authentication or authentication bypassing based on the information relating to whether to perform the authentication or not in the command.

2. The information processing apparatus of claim 1, further comprising:
   a communication analysis unit supplied with power by the power control unit regardless of the power state of the main body,
   wherein the communication analysis unit comprises:
   a second control unit configured to control processing in the communication analysis unit; and
   a second storage unit configured to store a startup program to perform an operation to serve as the startup unit, wherein the second control unit analyzes the command and causes the power control unit configured to supply power to the main body by executing the startup program in accordance with a result of the analysis.

3. The information processing apparatus of claim 2, wherein
when the second control unit determines from analysis that the command includes information to designate whether to perform or not to perform an authentication relating to environment in which the information processing apparatus is started,
the second control unit causes the power control unit configured to supply power to the main body after performing authentication relating to the environment or bypassing the authentication.

4. The information processing apparatus of claim 1, wherein
when a transmission source of the command is determined to be proper, the first control unit performs an operation based on the result of the analysis of the command.

5. The information processing apparatus of claim 4, wherein
the transmission source of the command is authenticated by an analysis of authentication information included in the command.

6. The information processing apparatus of claim 4, wherein the transmission source of the command is authenticated by whether or not the transmission source can decrypt the command that is encrypted.

7. An authentication bypassing method for designating whether or not to perform authentication to an information processing apparatus including a main body, a communication unit configured to receive a command, a power control unit configured to control power supply, and a startup unit configured to start the main body over a network, the authentication bypassing method comprising:
receiving a command transmitted over the network in the communication unit;
causing the power control unit to start the main body;
analyzing the command;
determining whether or not the command includes information to designate whether to perform or not to perform authentication of firmware to set an input and an output of the information processing apparatus or a first storage unit configured to store an operating system of the information processing apparatus;
performing authentication or authentication bypassing based on an operation table indicating either authentication or authentication bypassing to be performed in accordance with the power state and a power state immediately prior to reception of the command in the main body when the command is not determined from analysis that the command includes the information to designate whether to perform or not to perform authentication of the firmware or the first storage unit, and
performing authentication or authentication bypassing based on the information indicating either authentication or authentication bypassing to be performed when the command is determined from analysis that the command includes the information to designate whether to perform or not to perform authentication of the firmware or the first storage unit.

8. The authentication bypassing method of claim 7 wherein
a second control unit configured to which power is supplied regardless of a power state of the main body analyzes the command, and causes the power control unit configured to supply power to the main body in accordance with a result of the analysis.

9. The authentication bypassing method of claim 8 wherein
the second control unit causes the power control unit configured to supply power to the main body after performing authentication relating to the environment or bypassing the authentication when the command is determined from analysis that the command includes information to designate whether to perform or not to perform an authentication relating to environment in which the information processing apparatus is started.

10. The authentication bypassing method of claim 7, further comprising authenticating whether a transmission source of the command is a proper transmission source or not, wherein
when a transmission source of the command is determined from the authenticating to be proper, the first control unit performs an operation based on the result of the analysis of the command.

11. The authentication bypassing method of claim 10, wherein
the authentication of the transmission source is performed by an analysis of authentication information included in the command.

12. The authentication bypassing method of claim 10, wherein the authentication of the transmission source is performed in accordance with whether or not the transmission source can decrypt the command that is encrypted.

* * * * *